United States Patent
Takeichi et al.

(10) Patent No.: US 11,766,061 B2
(45) Date of Patent: Sep. 26, 2023

(54) SOY SAUCE-LIKE LIQUID SEASONING AND METHOD FOR PRODUCING SAME

(71) Applicant: Kikkoman Corporation, Chiba (JP)

(72) Inventors: Junya Takeichi, Chiba (JP); Akitoshi Komura, Chiba (JP); Takeharu Nakahara, Chiba (JP)

(73) Assignee: KIKKOMAN CORPORATION, Chiba (JP)

( * ) Notice: Subject to any disclaimer, the term of this patent is extended or adjusted under 35 U.S.C. 154(b) by 230 days.

(21) Appl. No.: 17/111,911

(22) Filed: Dec. 4, 2020

(65) Prior Publication Data

US 2021/0084952 A1    Mar. 25, 2021

Related U.S. Application Data

(62) Division of application No. 16/064,713, filed as application No. PCT/JP2015/086132 on Dec. 24, 2015, now abandoned.

(51) Int. Cl.
   *A23L 27/50*    (2016.01)
   *A23L 27/24*    (2016.01)
   *A23L 11/50*    (2021.01)

(52) U.S. Cl.
   CPC .............. *A23L 27/50* (2016.08); *A23L 11/50* (2021.01); *A23L 27/24* (2016.08); *A23V 2002/00* (2013.01)

(58) Field of Classification Search
   None
   See application file for complete search history.

(56) References Cited

U.S. PATENT DOCUMENTS

| | | | |
|---|---|---|---|
| 5,141,756 A * | 8/1992 | Bajracharya | A23L 27/50 426/589 |
| 5,888,561 A | 3/1999 | Niederberger et al. | |
| 5,965,178 A | 10/1999 | Baensch et al. | |
| 2003/0129277 A1 | 7/2003 | Kasuga et al. | |
| 2012/0177783 A1 | 7/2012 | Endo et al. | |
| 2014/0004225 A1 | 1/2014 | Akamatsu et al. | |

FOREIGN PATENT DOCUMENTS

| | | |
|---|---|---|
| JP | 40-004433 | 3/1965 |
| JP | 50-019995 | 3/1975 |
| JP | 50-019997 | 3/1975 |
| JP | 61-037085 | 2/1986 |
| JP | 62-062143 | 12/1987 |
| JP | 05-219915 | 8/1993 |
| JP | 3065695 | 7/2000 |
| JP | 2002-159278 | 6/2002 |
| JP | 2003-289826 | 10/2003 |
| JP | 2003-334021 | 11/2003 |
| JP | 2004-008026 | 1/2004 |
| JP | 3827300 | 9/2006 |
| JP | 2007-181450 | 7/2007 |
| JP | 2009-165377 | 7/2009 |
| JP | 2012-70636 | 4/2012 |
| JP | 2012-070636 | 4/2012 |
| RU | 2 187 947 | 8/2002 |
| WO | WO 11/136093 | 11/2011 |
| WO | 2012/128290 | 9/2012 |
| WO | WO 12/128290 | 9/2012 |

OTHER PUBLICATIONS

UH: University of Hawaii: Fungi In Manufacturing of Food; published online at least by Apr. 12, 2000 at: https://web.archive.org/web/20000412055145/http://www.botany.hawaii.edu/faculty/wong/BOT135/Lect16.htm (Year: 2000).*
MIT: Massachusetts Institute of Technology: Case Study I—Soy Sauce; published online at least by Jul. 30, 2013 at: https://web.archive.org/web/20130730121944/http://web.mit.edu/7.01x/7.014/pdfs/CS1_soy_sauce-AK.pdf (Year: 2013).*
See: Yamasa soy sauce factory visit: Preparation of the brew, printed on Mar. 7, 2023. (Year: 2023).*
Waterman: Chapter 2: Bean Brew, Instructor's Guide, from: Biological Inquiry: A Workbook of Investigative Case Studies; a text book published Jan. 8, 2005 by Benjamin Cummings. (Year: 2005).*
Mashiko: JP 2012-70636 A; published: Apr. 12, 2012 (Year: 2012).*
Akamatsu: WO 2012/128290 AI; published: Sep. 27, 2012 (Year: 2012).*
TYW: Effect of temperature on moromi fermentation of soy sauce with intermittent aeration; Mar. 2010; African Journal of Biotechnology 9(5):702-706; DOI:10.5897/AJB09.1548 (Year: 2010).*
JP H04316461 A, published Nov. 6, 1992 (Year: 1992).*
Office Action dated Jul. 26, 2021 in the corresponding Colombian Patent Application No. NC2018/0006450, with English translation.
Gao, X. et al., "Changes in the chemical composition of traditional Chinese-type soy sauce at different stages of manufacture and its relation to taste", International Journal of Food Science and Technology, 2011, 46, pp. 243-249.
Office Action dated Dec. 25, 2020 in corresponding Chinese Patent Application No. 201580085528.6, with English translation.
International Search Report dated Feb. 2, 2016 in International (PCT) Application No. PCT/JP2015/086132.

(Continued)

*Primary Examiner* — Patricia A George

(74) *Attorney, Agent, or Firm* — Wenderoth, Lind & Ponack, L.L.P.

(57) ABSTRACT

Provided herein is a salt-free or low-salt soy sauce-like liquid seasoning having a desirable flavor and desirable functionality with no contamination by microorganisms. A method for producing such a sauce-like liquid seasoning is also provided. The salt-free or low-salt soy sauce-like liquid seasoning having a desirable flavor and desirable functionality is obtained by inoculating raw material grains of primarily soybean or wheat with a koji mold to prepare a solid koji, adding salt-free or low-salt water for brewing to the solid koji to prepare a moromi, pasteurizing the moromi, and fermenting the moromi with yeast in a container adapted to reduce entry of harmful microorganisms.

2 Claims, No Drawings

(56) References Cited

OTHER PUBLICATIONS

Written Opinion of the International Searching Authority dated Feb. 2, 2016 in International (PCT) Application No. PCT/JP2015/086132.
Notification of Reasons for Refusal dated Dec. 18, 2014 in Japanese Patent Application No. 2014-223257, with Machine Translation.
Edited by Hiroyasu Fukuba et al., Chomiryo-Koshimyo no Jiten, Asakura Shoten, 1996 Nen, pp. 212 to 213, with English Translation.
Extended European Search Report dated May 3, 2019 in corresponding European Patent Application No. 15911360.4.
Office Action dated May 20, 2019 in corresponding Russian Patent Application No. 2018122799, with English Translation.
Office Action dated Sep. 2, 2021 in corresponding Chinese Patent Application No. 201580085528.6, with English translation.

\* cited by examiner

SOY SAUCE-LIKE LIQUID SEASONING AND METHOD FOR PRODUCING SAME

TECHNICAL FIELD

The present invention relates to a salt-free or low-salt soy sauce-like liquid seasoning, and to a method for producing such a soy sauce-like liquid seasoning.

BACKGROUND ART

The traditional method of producing Japanese soy sauce follows the following steps. A mixture of boiled soybeans and roasted wheat is inoculated with a koji mold to make a soy sauce koji. The mixture is brewed with high-concentration saline to produce a moromi (moromi-mash), which is then fermented and matured for an extended time period of several months to a year. The high-concentration saline is used mainly to inhibit growth of putrefactive bacteria. However, there have been concerns over the possible link between excessive intake of salt and high-blood pressure, renal disease, or the like, and there is an increasing demand for a soy sauce with reduced salt (low sodium content).

With regard to a method for producing a salt-free or low-salt soy sauce, an indirect production method is reported in which, in order to prevent microorganism contamination, soy sauce koji brewed with high-concentration saline in a traditional fashion is desalted by removing salt through a membrane process such as by using an ion-exchange membrane after fermentation and maturing (see, for example, PTL 1). However, a liquid seasoning obtained by such an indirect production method has problems, including the high cost due to the long desalting process, and adverse effect on flavor, such as bitterness and a harsh taste.

A direct production method is also reported in which brewing is conducted under salt-free or low-salt conditions by controlling pH and temperature in combination with using high nitrogen or alcohol for brewing (see, for example, PTL 2 to PTL 4). However, a problem of brewing under salt-free and low-pH conditions is that it alone cannot completely prevent spoilage by microorganisms. The brewing using high nitrogen is also problematic because it involves poor filterability. The brewing under high temperature involves problems such as incomplete yeast fermentation, and impartment of an odor due to warm brewing and bitterness. Microorganism growth can be reduced with the brewing using alcohol. However, there is a problem that the added alcohol has an effect on yeast fermentation and flavor.

A low-salt liquid seasoning is also reported that is obtained by a process in which the digestion of a moromi takes place simultaneously with alcohol fermentation. Specifically, in digesting the raw-material carbohydrate or protein, or a mixture of these materials with less than 2% (w/v) salt, alcohol-producing yeasts are added after adjusting the pH of the initial moromi to 4 to 6 (see PTL 5). A drawback of this technique, however, is that growth of microorganisms in the moromi cannot be sufficiently reduced in early stages of fermentation, and contamination often occurs.

A liquid seasoning is also reported that is produced by mixing soy sauce koji with 70 to 80° C. hot water to prepare a moromi having a temperature of 50 to 57° C., and intermittently or continuously stirring the moromi while maintaining the moromi temperature. With a salt concentration of 0 to 5% (w/v), spoilage of the moromi is prevented, and the processing time is reduced (see PTL 6). However, while this technique enables production of a low-salt moromi, the process requires adding salt in a lactic acid or yeast fermentation step, or in some other step subsequent to these steps. This makes it difficult to obtain a low-salt soy sauce-like liquid seasoning.

As described above, there are many reports of salt-free or low-salt soy sauce-like liquid seasonings. However, these are insufficient in terms of practicality, and there is a need for a salt-free or low-salt soy sauce-like liquid seasoning having a desirable taste that can be produced without microorganism contamination.

CITED REFERENCES

Patent Literature

PTL 1: JP-B-45-020887
PTL 2: JP-B-62-062143
PTL 3: JP-A-5-219915
PTL 4: JP-A-2009-165377
PTL 5: Japanese Patent No. 3065695
PTL 6: Japanese Patent No. 3827300

DISCLOSURE OF THE INVENTION

Problems to be Solved by the Invention

The present invention is intended to find a solution to the foregoing problems, and it is an object of the present invention to provide a salt-free or low-salt soy sauce-like liquid seasoning having a desirable flavor and desirable functionality with no contamination by harmful microorganisms, and a method for producing such a sauce-like liquid seasoning.

Means for Solving the Problems

The present inventors conducted intensive studies to solve the foregoing problems, and found that a salt-free or low-salt soy sauce-like liquid seasoning having a desirable flavor and desirable functionality with no contamination by harmful microorganisms can be obtained when a solid koji prepared by inoculating raw material grains of primarily soybean or wheat with a koji mold is prepared into a moromi with addition of salt-free or low-salt water for brewing, and the moromi, after pasteurization, is fermented with yeast while preventing contamination with the use of a container adapted to reduce entry of harmful microorganisms. The present invention has been completed on the basis of this finding.

Specifically, the present invention is related to the following.

(1) A soy sauce-like liquid seasoning having a salt concentration of less than 4% (w/v), and comprising 20 ppm (w/v) or more of isoamyl alcohol, 6 ppm (w/v) or more of 2-phenylethanol, 9 ppm (w/v) or more of isobutyl alcohol, and 10 ppm (w/v) or more of HEMF (4-Hydroxy-2(or 5)-ethyl-5(or 2)-methyl-3(2H)-furanone 2,3) with respect to a total nitrogen concentration of 1.0% (w/v).

(2) The soy sauce-like liquid seasoning described in (1) above, which contains 50 ppm (w/v) or less of sodium ions.

(3) A method for producing the soy sauce-like liquid seasoning of (1) or (2) above, the method comprising the steps of:
1. inoculating raw material grains of primarily soybean or wheat with a koji mold to prepare a solid koji, and adding water or saline to heat and hydrolyze a moromi having a salt concentration of less than 4% (w/v);
2. pasteurizing the moromi obtained in the step 1; and 3. inoculating the pasteurized moromi obtained in the step 2 with yeast, and fermenting the moromi with the yeast in a container adapted to reduce entry of harmful microorganisms.

Effect of the Invention

According to the present invention, a salt-free or low-salt soy sauce-like liquid seasoning having a desirable taste and aroma with no contamination by harmful microorganisms can be obtained.

Also, the salt-free liquid seasoning produced by the present invention has an extremely low sodium ion concentration, and a desirable flavor, and can be used as a soy sauce-like liquid seasoning suited for people suffering from, for example, high-blood pressure, or renal disease.

EMBODIMENTS FOR CARRYING OUT THE INVENTION

The present invention is described below in detail.

In the present invention, a soy sauce moromi having a salt concentration of less than 4% (w/v) is prepared by mixing water or saline into a solid koji prepared from raw material grains. The moromi is then heated and hydrolyzed at 25 to 57° C. for 0 to 48 hours. Preferably, 70 to 80° C. hot water or saline is mixed into a solid koji, and the mixture is stirred intermittently or continuously in a tank while maintaining the moromi at 50 to 57° C., and hydrolyzed with enzyme for 15 to 30 hours, as in Japanese Patent No. 3827300.

As used herein, "raw material grains" refers to, for example, protein materials such as whole soybean, defatted soybean, soy protein, wheat gluten, green pea, broad pea, and red pea, and starch materials such as wheat, barley, rye, wheat bran, rice, rice bran, corn, and starch pulp. These may be used alone or in combination.

The solid koji used herein is obtained by inoculating a protein material prepared by using an ordinary method or a mixture of the protein material and a starch material with a koji mold such as *Aspergillus sojae*, and *Aspergillus oryzae*, and conducting solid culturing for 2 to 3 days (koji-making).

When mixing protein and starch materials, these are mixed at a weight ratio of preferably 1:0.25 to 4 when, for example, a liquid seasoning similar to a regular soy sauce is desired. However, the combination ratio of these materials are not particularly limited.

The water or saline used for brewing is used in amounts that are sufficient to soak koji. Typically, the amount of water or saline is preferably 1 to 4 times the weight of koji by volume (v/w). At the time of thermal hydrolysis, an edible acid, an enzyme agent, or activated carbon may be added to improve mold resistance, hydrolysis efficiency, and flavor, as will be described later. For the purpose of reducing bubbling during yeast fermentation, an emulsion-type silicone defoaming agent may be added in a final concentration of 0.01 to 0.5% (w/v).

At the time of thermal hydrolysis, an enzyme agent may be added in a final concentration of 0.001 to 1% (w/v) to promote moromi hydrolysis. Examples of the enzyme agent include protease (endoprotease, exoprotease), cellulase, and pectinase.

The thermal hydrolysis is followed by heat pasteurization of the soy sauce moromi having a salt concentration of less than 4% (w/v). The heat pasteurization method is not particularly limited, and may be any of, for example, UHT (ultra high temperature heating method), HTST (high temperature short time method sterilization), retort, pressurized tank, steam injection, steam infusion, autoclave, plate heater, surface scrape, Joule heat-exchange, and tubular pasteurization methods. Preferred are methods using a pressurized tank, and a tubular pasteurizer. For example, the moromi may be pasteurized by applying heat under applied pressure while uniformly stirring the moromi in a pressurized tank. Pasteurization of unwanted bacteria becomes insufficient when the pasteurization temperature is too low, or when the pasteurization time is too short, and it is not preferable. Conversely, the flavor of the liquid seasoning deteriorates when the pasteurization temperature is too high, or when the pasteurization time is too long, and it is not preferable. Preferably, the moromi is pasteurized for, for example, 2 minutes to 180 minutes at 80° C., 5 seconds to 15 minutes at 121° C., or 1 second to 30 seconds at 130° C., though the optimum conditions vary with the selected method of pasteurization.

The pH of the prepared moromi may be adjusted to improve mold resistance or to adjust taste. Desirably, the pH is adjusted to 3.0 to 7.0, preferably 4.0 to 5.5 from the viewpoint of mold resistance and yeast fermentation. The pH may be adjusted at the time of thermal hydrolysis, or before or after the heat pasteurization of the moromi. Examples of the edible acid as a pH adjuster include lactic acid, acetic acid, malic acid, citric acid, gluconic acid, and adipic acid. Preferred for flavor is lactic acid.

For smooth yeast fermentation, 0 to 20% (w/v) of sugar may be added to the moromi. The sugar may be any sugar, as long as it can be utilized by yeast. Examples include glucose, fructose, sucrose, maltose, mannose, and glycerol. However, it is desirable to use glucose in view of utilization efficiency. The important aroma component HEN IF of soy sauce can be increased with the use of a pentose, such as ribose and xylose, even when the soy sauce is salt-free or low-salt, as described in JP-A-2001-120293. The sugars may be used alone or in combination. It is also possible to use food materials containing these sugars. Examples of such food materials include a table sugar, a high fructose corn syrup (liquid sugar which includes less than 50% of fructose), a high fructose corn syrup (liquid sugar which includes 50% or more and less than 90% of fructose), a soft brown sugar, and a molasses.

Before yeast fermentation, an enzyme agent may be added in a final concentration of 0.001 to 1% (w/v) to promote moromi hydrolysis, or to improve pressability. Examples of the enzyme agent include protease (endoprotease, exoprotease), cellulase, and pectinase.

Before yeast fermentation, activated carbon may be added to the moromi to eliminate bitterness, and improve flavor. Preferably, the activated carbon is a powder, more preferably a powder with an average particle size of 10 to 100 μm. The activated carbon is added preferably in an amount of 0.1 to 5% (w/w) with respect to the raw material of the moromi. The kind of activated carbon may be appropriately selected according to the intended use. For example, activated carbons having functions such as elimination of bitterness, removal of bad odor, adjustment of taste, and adjustment of color may be used in combination.

The yeast used in the present invention is not particularly limited. For example, *Saccharomyces cerevisiae, Zygosaccharomyces rouxii*, and *Kluyveromyces marxianus* may be used. Because the moromi of the present invention is salt-free or low-salt, it is also possible to use other yeasts, including, for example, weakly halotolerant wine yeasts, beer yeasts, and shochu (distilled alcoholic beverage) yeasts.

Preferably, the yeast is added in a concentration of $1\times10^5$ cells or more, preferably $1\times10^6$ to $1\times10^7$ cells per gram of moromi.

For yeast fermentation, the moromi is charged into a container adapted to reduce the contamination of harmful microorganisms. Here, the container adapted to reduce the contamination of harmful microorganisms is a container that is structured to block inside of the container from ambient air. For experimental purposes, the container may be a polypropylene jar processed for removal of bacteria or a glass media bottle. For industrial production, the container may be a jar fermenter with a function to supply air without bacteria into the container, or a pressurized fermentation tank. For removal of bacteria in air, a filter capable of collecting at least 99.97% of dust of 0.3-μm or larger may be used, for example, such as a HEPA filter.

The yeast is fermented at a yeast growing temperature, specifically at 15 to 45° C., preferably 20 to 30° C., for 1 to 90 days, preferably 3 to 28 days.

The amount of alcohol produced in the soy sauce-like liquid seasoning of the present invention may be adjusted in the 0 to 20% (w/v) range according to the concentration of the sugar added in the fermentation step, the type of the yeast used, or the fermentation conditions. Alcohol may also be added at the completion of the fermentation. However, in order to provide the soy sauce-like liquid seasoning with the soy sauce-like flavor, the alcohol content is preferably less than 8% (w/v), more preferably 2 to 7% (w/v). The alcohol concentration may be measured by using a known method, for example, with a measurement kit using gas chromatography or an enzyme method.

After fermentation, the moromi may be processed by an ordinary method, such as pressing, heating, refining, and filtration, so that a soy sauce-like liquid seasoning having a desirable flavor and functionality with a salt concentration of less than 4% (w/v) can be obtained. The salt concentration can be measured by using methods such as potentiometry and the Mohr's method.

Unlike the known salt-free or low-salt soy sauce-like liquid seasoning, the soy sauce-like liquid seasoning of the present invention satisfies the following conditions for aroma component concentration, and has a flavor that more closely resembles the soy sauce-like flavor.

(1) The isoamyl alcohol concentration is 20 ppm (w/v) or more with respect to the total nitrogen concentration of 1.0% (w/v)

(2) The 2-phenylethanol concentration is 6 ppm (w/v) or more with respect to the total nitrogen concentration of 1.0% (w/v)

(3) The isobutyl alcohol concentration is 9 ppm (w/v) or more with respect to the total nitrogen concentration of 1.0% (w/v)

(4) The HEMF concentration is 10 ppm (w/v) or more with respect to the total nitrogen concentration of 1.0% (w/v)

It is known that isoamyl alcohol and 2-phenylethanol are responsible for the base note of sake, and that these alcohols, along with isobutyl alcohol, are aroma components of yeast fermentation origin that improve the flavor of soy sauce. The concentration of these aroma components can be measured by, for example, GC-MS (gas chromatography-mass spectrometry), or GC-FID (gas chromatography-flame ionization detection).

It is known that HEMF, an important aroma component of soy sauce, reduces its concentration in low-salt brewing process (J. Agric. Food Chem. Vol 44, 3273-3275, 1996). The soy sauce-like liquid seasoning of the present invention, however, has the same levels of HEMF concentration as a regular soy sauce, and has the soy sauce-like flavor.

The salt-free soy sauce-like liquid seasoning of the present invention, which is obtained without using any salt in the water used in the brewing step, has a sodium ion concentration of 50 ppm (w/v) or less. The salt-free soy sauce-like liquid seasoning of the present invention differs from known salt-free soy sauce-like liquid seasonings in this respect, and has a lower sodium concentration than known salt-free soy sauce-like liquid seasonings. The sodium ion concentration can be measured by using methods such as atomic absorption spectrometry and ICP emission spectrometry.

The following describes the present invention in greater detail using Examples. It should be noted that the technical scope of the present invention is in no way limited by the following Examples.

EXAMPLES

1. Production of Salt-Free Liquid Seasoning
Preparation of Soy Sauce Koji

Defatted processed soybean (50%, w/w), and roasted smashed wheat (50%, w/w) were mixed to prepare a soy sauce koji. The defatted processed soybeans were used after being soaked with water (130%, w/w) and boiled. The raw material was inoculated with a seed starter of *Aspergillus sojae*, and was processed for 42 hours using an ordinary method to obtain a soy sauce koji (koji-making).

Moromi Preparation

The above soy sauce koji was mixed with 200 weight parts of hot water (preheated to 70° C.; containing no salt) with respect to 100 weight parts of the koji. The mixture was then heated and hydrolyzed at 55° C. for 24 hours by being continuously stirred at 100 rpm in a hydrolysis tank equipped with an insulating jacket having stirring vanes on the rotating shaft. This produced a salt-free moromi.

Moromi Pasteurization

After being brought to pH 4.0 to 5.0 with lactic acid as shown in Table 1, the salt-free moromi (Examples 1-1 to 1-4, 300 g each) was put in a glass media bottle, and pasteurized with an autoclave at 121° C. for 5 minutes. To the moromi of each group was then added 50% (w/v) glucose processed for removal of bacteria in a final concentration of 5% (w/v), as shown in Table 1.

TABLE 1

| | Pasteurization | Moromi pH | Supplement sugar (final concentration) | Yeast | Fermentation temp. |
|---|---|---|---|---|---|
| Com. Ex. 1-1 | None | 4.0 | 5% glucose | *Z. rouxii* | 25° C. |
| Com. Ex. 1-2 | None | 4.5 | 5% glucose | *Z. rouxii* | 25° C. |

TABLE 1-continued

|  | Pasteurization | Moromi pH | Supplement sugar (final concentration) | Yeast | Fermentation temp. |
|---|---|---|---|---|---|
| Com. Ex. 1-3 | None | 5.0 | 5% glucose | Z. rouxii | 25° C. |
| Ex. 1-1 | 121° C., 5 min | 5.0 | 5% glucose | Z. rouxii | 20° C. |
| Ex. 1-2 | 121° C., 5 min | 5.0 | 5% glucose | Z. rouxii | 25° C. |
| Ex. 1-3 | 121° C., 5 min | 5.0 | 5% glucose | Z. rouxii | 30° C. |
| Ex. 1-4 | 121° C., 5 min | 5.0 | None | Z. rouxii | 30° C. |

Yeast Fermentation

A precultured soy sauce yeast (*Zygosaccharomyces rouxii*) was added to the moromi in a concentration of $1 \times 10^7$ cells/g moromi, and the mixture was fermented at a moromi temperature of 20 to 30° C. for 14 days, as shown in Table 1.

Refinement

After yeast fermentation, the moromi was pressed, heated, and racked to obtain a refined soy sauce-like liquid seasoning. Table 2 shows the common viable bacteria count, and the analytical values of the components of the obtained soy sauce-like liquid seasoning.

Common Viable Bacteria Count, and Component Analysis

For counting of common viable bacteria, the soy sauce-like liquid seasoning was cultured in a medium prepared by adding 30 μg/ml of nystatin to standard agar medium PEARLCORE (manufactured by Eiken Chemical Co., Ltd.), and the number of grown colonies was counted. It is to be noted that the common viable bacteria count obtained by this method does not include yeasts, and represents mainly the number of contaminating bacteria. The total nitrogen (TN) concentration, the alcohol concentration, and the pH were determined by using the methods described in Soy Sauce Testing Methods (published Mar. 1, 1985, ed. Japan Soy Sauce Research Center). The salt concentration was determined by the Mohr's method. The glutamic acid concentration was determined by using an amino acid analyzer.

TABLE 2

|  | Common viable bacteria count after yeast fermentation (cfu/ml) | NaCl % (w/v) | TN % (w/v) | Glu % (w/v) | pH | Alc % (v/v) |
|---|---|---|---|---|---|---|
| Com. Ex. 1-1 | $8.7 \times 10^7$ (spoilage) | 0 | 1.05 | 0.73 | 4.1 | 2.9 |
| Com. Ex. 1-2 | $3.8 \times 10^8$ (spoilage) | 0 | 1.10 | 0.82 | 4.2 | 2.3 |
| Com. Ex. 1-3 | $6.0 \times 10^8$ (spoilage) | 0 | 1.08 | 0.85 | 4.1 | 2.1 |
| Ex. 1-1 | $<1 \times 10^3$ | 0 | 1.14 | 0.78 | 4.7 | 5.9 |
| Ex. 1-2 | $<1 \times 10^3$ | 0 | 1.15 | 0.69 | 4.7 | 5.7 |
| Ex. 1-3 | $<1 \times 10^3$ | 0 | 1.15 | 0.73 | 4.6 | 5.4 |
| Ex. 1-4 | $<1 \times 10^3$ | 0 | 1.16 | 0.70 | 4.6 | 2.1 |

As can be seen from the results for Comparative Examples 1-1 to 1-3 in Table 2, it was not possible to obtain the desired soy sauce-like liquid seasoning when the moromi was not pasteurized, and spoilage occurred during the brewing process, even when the initial pH of the moromi was lowered to 4.0. On the other hand, the soy sauce-like liquid seasoning was obtained with no spoilage in the brewing process when the pasteurization step was conducted as in Examples 1-1 to 1-4, even when the alcohol concentration was low as in Example 1-4. The yeast fermentation was considered desirable also from an alcohol concentration standpoint. It was also confirmed that the preferred fermentation temperature is 20 to 30° C. to prevent an effect on yeast fermentation and flavor.

2. Modification of Method for Producing Salt-Free or Low-Salt Soy Sauce-Like Liquid Seasoning Preparation of Moromi with Increased Amount of Soy Sauce Koji As in Example 1, the soy sauce koji was mixed with 140 weight parts of heated 70° C. hot water with respect to 100 weight parts of the koji. In Example 2-4 and Comparative Examples 2-1 and 2-2, salt was added in the final concentrations shown in Table 3. After adding 1.5% (w/w) of activated carbon (Kujyaku TK2; manufactured by Kawakita Chemical Co., Ltd.) with respect to the raw material, the pH was adjusted to 4.8 with lactic acid, and the mixture was heated and hydrolyzed at 55° C. for 24 hours by being continuously stirred at 100 rpm in a hydrolysis tank equipped with an insulating jacket having stirring vanes on the rotating shaft. This produced a moromi. This moromi had a larger proportion of the soy sauce koji than the moromi of Example 1.

Production of Soy Sauce-Like Liquid Seasoning

The above moromi was pasteurized at 121° C. for 5 minutes using a jar fermenter, and 50% (w/v) glucose processed for removal of bacteria was added in a final concentration of 5% (w/v). To the mixture was then added precultured yeast (*Zygosaccharomyces rouxii, Saccharomyces cerevisiae, Kluyveromyces marxianus*) in a concentration of $1 \times 10^7$ cells/g moromi. After adding a commercially available enzyme agent (endoprotease, exoprotease) in a final concentration of 0.1% (w/w), the mixture was fermented with the yeast at a moromi temperature of 25° C. or 30° C. for 14 days, as shown in Table 3.

TABLE 3

|  | Moromi pH | NaCl % (w/v) | Yeast | Fermentation Temp. |
|---|---|---|---|---|
| Ex. 2-1 | 4.8 | 0 | Z. rouxii | 25° C. |
| Ex. 2-2 | 4.8 | 0 | S. cerevisiae | 25° C. |
| Ex. 2-3 | 4.8 | 0 | K. marxianus | 30° C. |
| Ex. 2-4 | 4.8 | 3 | Z. rouxii | 25° C. |
| Com. Ex. 2-1 | 4.8 | 16 | S. cerevisiae | 25° C. |
| Com. Ex. 2-2 | 4.8 | 16 | K. marxianus | 30° C. |

Refinement and Flavor Evaluation

After yeast fermentation, the moromi was pressed, heated, and racked to obtain a refined soy sauce-like liquid seasoning. Table 4 shows the analytical values of the components and the results of flavor evaluation of the liquid seasoning. The flavor was evaluated according to the following criteria.

Excellent: Very desirable
Good: Desirable
Poor: Undesirable

TABLE 4

| | NaCl % (w/v) | TN % (w/v) | Glu % (w/v) | pH | Alc % (v/v) | Flavor evaluation | Comment |
|---|---|---|---|---|---|---|---|
| Ex. 2-1 | 0 | 1.51 | 0.91 | 4.7 | 4.9 | Excellent | Sweet aroma |
| Ex. 2-2 | 0 | 1.51 | 0.93 | 4.7 | 5.6 | Good | Fruity aroma, sake-like flavor |
| Ex. 2-3 | 0 | 1.49 | 0.88 | 4.7 | 5.3 | Good | Fermentation odor, pickles odor |
| Ex. 2-4 | 3 | 1.47 | 0.88 | 4.7 | 5.1 | Excellent | Light soy sauce odor with sweet aroma |
| Com. Ex. 2-1 | 16 | 1.48 | 0.90 | 4.8 | 0 | Poor | Raw material odor, potato odor |
| Com. Ex. 2-2 | 16 | 1.48 | 0.90 | 4.8 | 0 | Poor | Raw material odor, potato odor |

By increasing the amount of the soy sauce koji used for moromi preparation, and adding an enzyme agent for yeast fermentation, it was possible to produce liquid seasonings having a desirable flavor with high total nitrogen concentration and high glutamic acid concentration.

The liquid seasonings fermented without salt as in Examples 2-1 and 2-2 had a sweet, elegant aroma as a whole, and the flavor was desirable. The low-salt liquid seasoning of Example 2-4 that underwent yeast fermentation under low salt concentration (3%, w/v) had an aroma that was more like a soy sauce, and the flavor was also desirable.

The sake yeast *S. cerevisiae* used in Example 2-2, and the heat-resistant yeast *K. marxianus* used in Example 2-3 had higher fermentation rates than the soy sauce yeast (*Z. rouxii*) used in Example 2-1, had a tendency to produce more alcohol, and are more desirable in terms of mold resistance. However, these yeasts are non-halotolerant yeasts, and do not grow well and fail to produce alcohol under high salt concentrations as in Comparative Examples 2-1 and 2-2, and cannot be used in the traditional brewing of soy sauce. An advantage of the salt-free or low-salt fermentation of the present invention is that it allows the use of these non-halotolerant microorganisms.

3. Production of Salt-Free Liquid Seasoning Having Improved Soy Sauce-Like Flavor Production of Pentose-Added Soy Sauce-Like Liquid Seasoning A 50% (w/v) glucose solution processed for removal of bacteria, and ribose or xylose were added to a pasteurized salt-free moromi produced in the same manner as in Example 2. These were added in the final concentrations (w/v) shown in Table 5. To the mixture was added soy sauce yeast *Z. rouxii* as in Example 2-1, and a commercially available enzyme agent (endoprotease, exoprotease) was added in a final concentration of 0.1% (w/w). The mixture was then fermented at a moromi temperature of 25° C. for 14 days. After yeast fermentation, the moromi was pressed, heated, and racked to obtain a refined soy sauce-like liquid seasoning.

TABLE 5

| | Moromi pH | NaCl % (w/v) | Yeast | Supplement sugar (final concentration) | Fermentation temp. |
|---|---|---|---|---|---|
| Ex. 2-1 (control) | 4.8 | 0 | Z. rouxii | 5% glucose | 25° C. |
| Ex. 3-1 | 4.8 | 0 | Z. rouxii | 4% glucose, 1% ribose | 25° C. |
| Ex. 3-2 | 4.8 | 0 | Z. rouxii | 4% glucose, 1% xylose | 25° C. |

Table 6 shows the analytical values of the components and the results of flavor evaluation of the soy sauce-like liquid seasoning. The flavor evaluation confirmed that adding ribose or xylose for fermentation enhances the soy sauce-like aroma and improves the quality, though the analytical values of the common components remained essentially the same. The result suggests that adding pentose is effective for further improvement of the soy sauce-like flavor of the salt-free soy sauce-like liquid seasoning.

TABLE 6

| | NaCl % (w/v) | TN % (w/v) | Glu % (w/v) | pH | Alc % (v/v) | Flavor evaluation |
|---|---|---|---|---|---|---|
| Ex. 2-1 | 0 | 1.51 | 0.91 | 4.7 | 4.9 | Sweet aroma |
| Ex. 3-1 | 0 | 1.45 | 0.78 | 4.7 | 4.8 | Characteristic fermentation odor of soy sauce |
| Ex. 3-2 | 0 | 1.47 | 0.90 | 4.7 | 3.0 | Characteristic fermentation odor of soy sauce, sharp |

4. Comparison of Desalted Soy Sauce, Commercially Available Koikuchi (Dark-Colored) Soy Sauce, and Commercially Available Salt-Free Soy Sauce Preparation of Desalted Soy Sauce Boiled and denatured defatted soybeans, and smashed roasted wheat were mixed in equal amounts, and the mixture was inoculated with a seed starter, and processed for 42 hours under aeration to obtain a soy sauce koji (koji-making). The koji was mixed into saline, and fermented and matured under controlled conditions where the moromi was fermented at 25 to 30° C. for 150 days with appropriate stirring using an ordinary method. This was followed by pressing and filtration, and an unheated soy sauce having a salt concentration of about 18% (w/v), and a total nitrogen concentration of about 1.7% (w/v) was obtained.

The unheated soy sauce was heated at 80° C. for 1 hour, and refined by filtration. The resulting soy sauce was desalted with an electrodialyzer (manufactured by Astom Corporation), and a desalted soy sauce of pH 4.7 having a salt concentration of 0.1% (w/v), a total nitrogen concentration of about 1.6% (w/v), and a glutamic acid concentration of about 0.9% (w/v) was obtained.

Analysis of Aroma Components

The concentrations of isoamyl alcohol, 2-phenylethanol, isobutyl alcohol, and HEMF were measured by using the quantitative analysis method described in J. Agric. Food Chem. Vol. 39, 934, 1991. Specifically, these were analyzed by gas chromatography (6890N; manufactured by Agilent Technologies), and the content of each aroma component was determined by the standard curve method using a standard substance.

Table 7 shows the results of aroma component analysis for the liquid seasonings of Examples (Examples 1-4, 2-1, 2-2, 2-4, 3-1, and 3-2), a desalted soy sauce, a commercially available koikuchi (dark-colored) soy sauce (manufactured by Kikkoman Corporation), and a commercially available soy sauce-like liquid seasoning brewed with alcohol (commercially available salt-free soy sauce). It was confirmed that the isoamyl alcohol, 2-phenylethanol, and isobutyl alcohol concentrations with respect to 1% (w/v) total nitrogen concentration tended to be overall higher in the soy sauce-like liquid seasonings of the present invention than in the desalted soy sauce and the commercially available soy sauce, and that the soy sauce-like liquid seasonings of the present invention had isoamyl alcohol concentration of 20 ppm (w/v) or more, 2-phenylethanol concentration of 6 ppm (w/v) or more, and isobutyl alcohol concentration of 9 ppm (w/v) or more and were salt-free or low-salt liquid seasonings having a desirable flavor. It was also confirmed that the liquid seasonings of Examples 2-1, 2-2, and 2-4 had the same levels of HEMF concentration as the desalted soy sauce and the commercially available koikuchi (dark-colored) soy sauce, and also had the soy sauce-like flavor.

It was also confirmed that the salt-free liquid seasonings prepared by adding pentose as in Examples 3-1 and 3-2 had even higher HEMF concentrations, and that a liquid seasoning having an enhanced soy sauce-like flavor can be obtained when pentose is added in implementing the present invention.

TABLE 7

| | NaCl % (w/v) | Alc % (w/v) | TN % (w/v) | Concentration (ppm, w/v) with respect to TN 1% (w/v) | | | | Production summary |
| --- | --- | --- | --- | --- | --- | --- | --- | --- |
| | | | | Isoamyl alcohol | 2-Phenyl ethanol | Isobutyl alcohol | HEMF | |
| Ex. 1-4 | 0 | 2.1 | 1.16 | 23.7 | 6.9 | 9.3 | 12.1 | No supplement sugar, low alcohol |
| Ex. 2-1 | 0 | 4.9 | 1.51 | 99.1 | 31.3 | 28.6 | 18.8 | |
| Ex. 2-2 | 0 | 5.6 | 1.51 | 48.2 | 15.3 | 21.2 | 11.7 | Fermentation with S. cerevisiae |
| Ex. 2-4 | 3.0 | 5.1 | 1.47 | 100.8 | 45.0 | 44.6 | 14.2 | Fermentation with 3% salt |
| Ex. 3-1 | 0 | 4.8 | 1.45 | 70.5 | 18.0 | 29.9 | 41.0 | 1% Ribose was added for fermentation |
| Ex. 3-2 | 0 | 3.0 | 1.47 | 74.4 | 18.1 | 28.9 | 29.8 | 3% Xylose was added for fermentation |
| Desalted soy sauce | 0.1 | 2.3 | 1.66 | 2.3 | 1.0 | 3.5 | 13.4 | Brewing followed by electrodialysis desalting |
| Commercially available koikuchi (dark-colored) soy sauce | 16.0 | 3.0 | 1.60 | 2.6 | 3.0 | 4.4 | 16.6 | Brewing |
| Commercially available salt-free soy sauce | 0.2 | 13.4 | 2.06 | 0.0 | 1.8 | 0.0 | 2.1 | Brewed with alcohol |

Analysis of Metal Ion Concentration

The metal ion concentration was analyzed by atomic absorption spectrophotometry with air-acetylene flame, using an atomic absorption spectrophotometer AA6300 (manufactured by Shimadzu Corporation). A standard curve was created using a standard solution for atomic absorption spectrophotometry (manufactured by Kanto Kagaku).

Table 8 shows the metal ion concentrations of the salt-free soy sauce-like liquid seasoning of Example 2-1, the desalted soy sauce prepared in Section 4 above, and a commercially available salt-free soy sauce. The salt-free soy sauce-like liquid seasoning of the present invention had a considerably lower sodium ion concentration than the other soy sauces. The desalted soy sauce had a low potassium ion concentration, but the sodium ion concentration was relatively high due to electrodialysis efficiency. These results suggest that the salt-free soy sauce-like liquid seasoning of the present invention is a liquid seasoning having a considerably lower sodium ion concentration than traditional salt-free or low-salt soy sauce-like liquid seasonings, and that is functionally desirable for, for example, the prevention of salt-sensitive hypertension.

TABLE 8

|  | Na ppm (w/v) | K ppm (w/v) | Mg ppm (w/v) |
|---|---|---|---|
| Ex. 2-1 | 1 | 433 | 75 |
| Desalted soy sauce | 530 | 8 | 60 |
| Commercially available salt-free soy sauce | 78 | 545 | 97 |

Sensory Evaluation

The sensory evaluation was made by eight trained panelists having a discrimination ability, and these panelists were asked to give scores. Specifically, the salt-free liquid seasonings of Examples 1-4, 2-1, 2-2, 3-1, and 3-2, a sample prepared by adding alcohol to the sample of Example 2-1 in a final concentration of 8.5% (w/v), and a commercially available salt-free soy sauce were evaluated for intensities of saltiness, umami, bitterness, and soy sauce-like taste, and for palatability (pleasantness), relative to the desalted soy sauce prepared in Section 4 above. The evaluation criteria are as follows.
1: Low intensity/poor palatability
2: Slightly low intensity/slightly poor palatability
3: Same intensity/same palatability
4: Slightly high intensity/slightly desirable palatability
5: High intensity/desirable palatability Table 9 shows the results of the sensory evaluation test for the salt-free liquid seasonings. The scores presented in the table are the mean values of the eight panelists. The samples of Examples 2-1 and 2-2 as the products of the present invention had improved umami and palatability than the desalted soy sauce. It was confirmed that the samples of Examples 3-1 and 3-2 also had an improved soy sauce-like taste due to increased HEMF. On the other hand, it was confirmed that the alcohol-added sample and the commercially available salt-free soy sauce had a strong alcohol taste, and tended to be unpleasant. The products of the present invention had a soy sauce-like aroma due to the high total nitrogen concentration and the high glutamic acid concentration, and the same levels of alcohol concentration as a brewed soy sauce. These contributed to the improved palatability.

TABLE 9

| | Average score | | | | | |
|---|---|---|---|---|---|---|
| | Saltiness | Umami | Bitterness | Soy sauce-like taste | Palatability | Comment |
| Desalted soy sauce | — | — | — | — | — | Plain taste with harshness |
| Ex. 1-4 | 2.8 | 3.0 | 3.0 | 2.8 | 3.1 | Mild soy sauce aroma, desirable flavor |
| Ex. 2-1 | 3.0 | 3.6 | 3.4 | 2.8 | 3.6 | Elegant aroma, desirable flavor |
| Ex. 2-2 | 3.3 | 3.6 | 3.3 | 2.6 | 3.5 | Elegant sake-like flavor |
| Ex. 3-1 | 3.3 | 3.4 | 3.4 | 3.4 | 3.5 | Strong soy sauce-like aroma, desirable flavor |
| Ex. 3-2 | 3.4 | 3.1 | 3.6 | 3.5 | 3.8 | Sharp soy sauce-like aroma, desirable flavor |
| Ex. 2-1 + alcohol (8.5%) | 2.8 | 3.0 | 3.5 | 2.0 | 2.0 | Strong alcohol taste, no soy sauce-like flavor |
| Commercially available salt-free soy sauce | 3.0 | 2.8 | 4.1 | 1.9 | 1.5 | Strong alcohol taste with bitterness |

The same sensory evaluation was conducted for the low-salt liquid seasonings, specifically, for the sample of Example 2-4 (3% salt), and for a sample prepared by adding salt to a desalted soy sauce in a final concentration of 3% (N=8). By the presence of a small quantity of salt, the sample of Example 2-4 containing 3% salt had greatly improved saltiness, umami, soy sauce-like taste and palatability, and was evaluated as a more-balanced liquid seasoning compared with the desalted soy sauce to which salt was added to have the same salt concentration.

These results confirmed that the soy sauce-like liquid seasoning of the present invention, despite being salt-free or low-salt, has an excellent flavor, and more desirable palatability than the desalted soy sauce, the commercially available salt-free soy sauce, and the soy sauce prepared by adding salt or alcohol to the desalted soy sauce.

Experimental Production of Salt-Free Liquid Seasoning
(A) High-Temperature Hydrolysis with Acetic Acid—Pasteurization of Moromi Solution—Yeast Fermentation A soy sauce koji (7.8 kg) containing defatted processed soybeans (50%, w/w) and roasted smashed wheat (50%, w/w) was charged into a 30-L jar fermenter with 12 L of 75° C. hot water and 100 mL of acetic acid. The mixture was stirred at 55° C. for 24 hours for hydrolysis. The hydrolyzed moromi was filtered through filter paper to separate liquid from solid, and the filtrate (moromi solution) was heat pasteurized at 121° C. for 3 minutes. To the pasteurized moromi solution was added 1 L of glucose, and 1×10$^6$ cells/mL of soy sauce yeast (*Zygosaccharomyces rouxii*), and the mixture was fermented at a moromi temperature of 30° C. for 7 days.

(B) High-Temperature Hydrolysis with Lactic Acid—Pasteurization of Moromi Solution—Yeast Fermentation The same soy sauce koji used in (A) (7.8 kg) was charged into a 30-L jar fermenter with 12 L of 75° C. hot water and 100 mL of lactic acid. The mixture was stirred at 55° C. for 24 hours for hydrolysis. The hydrolyzed moromi was filtered through filter paper to separate liquid from solid, and the filtrate (moromi solution) was heat pasteurized at 121° C. for 3 minutes. To the pasteurized moromi solution was added 1 L of glucose, and 1×10$^6$ cells/mL of soy sauce yeast (*Zygosaccharomyces rouxii*), and the mixture was fermented at a moromi temperature of 30° C. for 7 days.

(C) High-Temperature Hydrolysis with Lactic Acid—Moromi Pasteurization—Yeast Fermentation The same soy sauce koji used in (A) (7.8 kg) was charged into a 30-L jar fermenter with 12 L of 75° C. hot water and 100 mL of lactic acid. The mixture was stirred at 55° C. for 24 hours for hydrolysis. The hydrolyzed moromi was heat pasteurized at 121° C. for 3 minutes while being stirred in the jar fermenter. To the pasteurized moromi was added 1 L of glucose, and 1×10$^6$ cells/mL of soy sauce yeast (*Zygosaccharomyces rouxii*), and the mixture was fermented at a moromi temperature of 30° C. for 7 days.

Results

Table 11 shows the analytical values and the results of flavor evaluation of these liquid seasoning samples. There was no large difference between the analytical values of the samples. However, the samples were greatly different in terms of flavor. The acetic acid hydrolysis sample (A) had a notable acid odor, and the taste was too plain. The moromi solution pasteurized sample (A, B) had an off-flavor including an oxidation odor and a deterioration odor. The sample of (C) had umami with a flavor that most closely resembled a soy sauce.

TABLE 11

| Sample | pH | TN (%, w/v) | Glu (%, w/v) | Alcohol (%, w/v) | Flavor evaluation |
|---|---|---|---|---|---|
| (A) Acetic acid-Pasteurization of moromi solution | 4.98 | 1.72 | 1.26 | 5.78 | Acid odor and deterioration odor are present Acid taste with little soy sauce-like taste |
| (B) Lactic acid-Pasteurization of moromi solution | 5.02 | 1.74 | 1.37 | 4.67 | Bitterness and acid odor/deterioration odor are present Sharp flavor |
| (C) Lactic acid-Moromi pasteurization | 5.03 | 1.90 | 1.51 | 5.55 | Soy sauce-like flavor Strong umami |

These results confirmed that the liquid seasoning of the present invention produced by yeast fermentation without solid-liquid separation had a flavor greatly different from that of the liquid seasoning produced by yeast fermentation with solid-liquid separation.

The invention claimed is:
1. A method for producing a low salt soy sauce liquid seasoning, comprising the ordered steps of:
   a. inoculating raw material grains of primarily soybean or wheat with a koji mold to prepare a solid koji, adding water or saline to said solid koji to prepare a moromi, and subjecting the moromi to thermal hydrolysis, wherein the moromi has a salt concentration of less than 4% (w/v);
   b. pasteurizing the moromi obtained in the step a, at a temperature of from 90 to 130° C.;
   c. inoculating the pasteurized moromi obtained in the step b with yeast, and fermenting the moromi with the yeast in a container being structured to block the inside of the container from ambient air, and
   d. pressing the moromi after yeast fermentation, thereby producing the low salt soy sauce liquid seasoning, wherein the low salt soy sauce liquid seasoning, comprises:
      20 ppm (w/v) or more of isoamyl alcohol,
      6 ppm (w/v) or more of 2-phenylethanol,
      9 ppm (w/v) or more of isobutyl alcohol, and
      10 ppm (w/v) or more of 4-hydroxy-2(or 5)-ethyl-5(or 2)-methyl-3(2H)-furanone (HEMF) with respect to a total nitrogen concentration of 1.0% (w/v), and
   the low salt soy sauce liquid seasoning has a salt concentration of less than 4% (w/v).
2. The method for producing a low salt soy sauce liquid seasoning according to claim 1, wherein the low salt soy sauce liquid seasoning contains 50 ppm (w/v) or less of sodium ions.

* * * * *